July 5, 1966 F. A. BEZLAJ 3,258,991
QUICK RELEASE HAND BRAKE MECHANISM
Filed Oct. 14, 1963 3 Sheets-Sheet 1
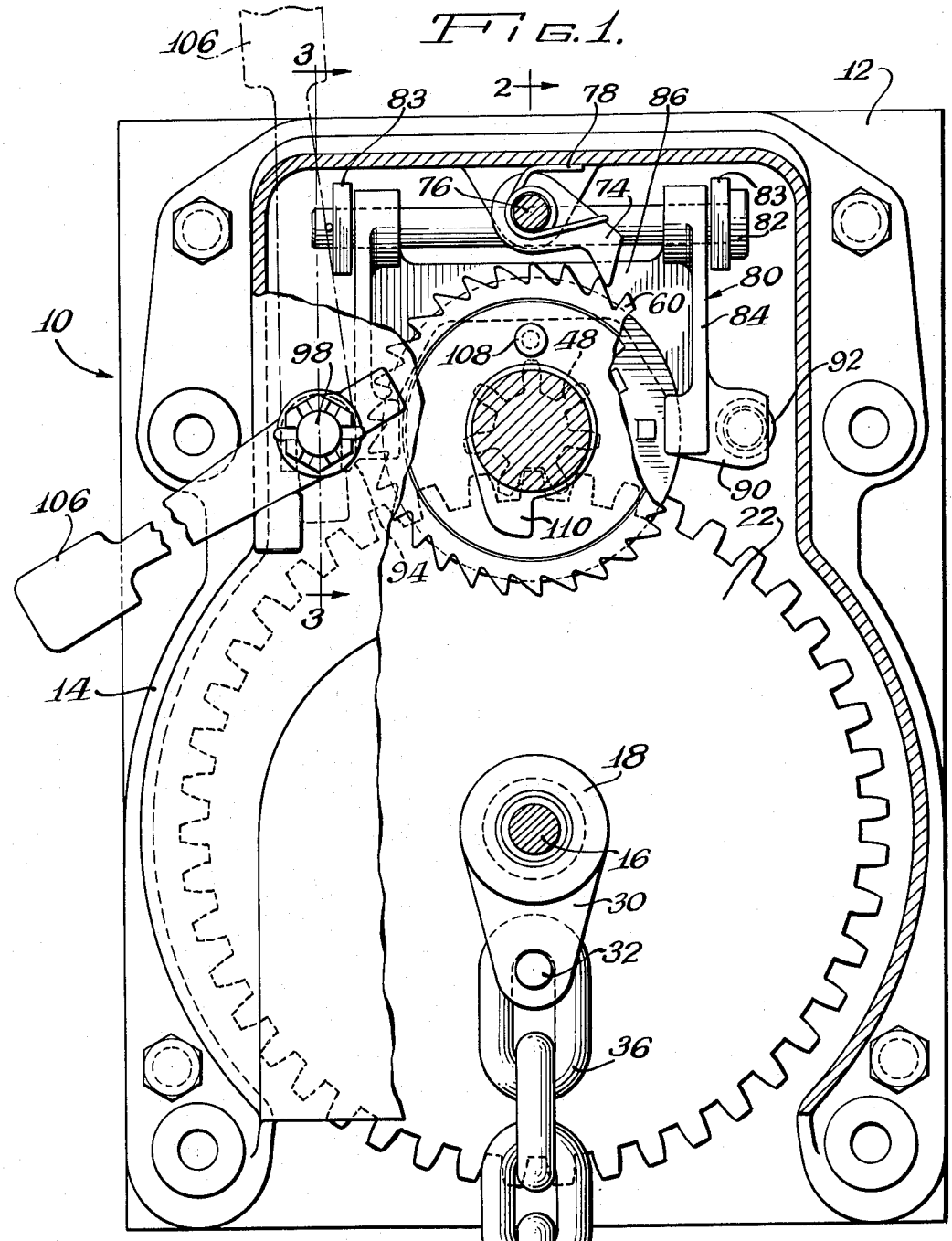
Inventor:
Frank A. Bezlaj
By Bair, Freeman
& Molinare Attys.

July 5, 1966  F. A. BEZLAJ  3,258,991
QUICK RELEASE HAND BRAKE MECHANISM
Filed Oct. 14, 1963  3 Sheets-Sheet 2
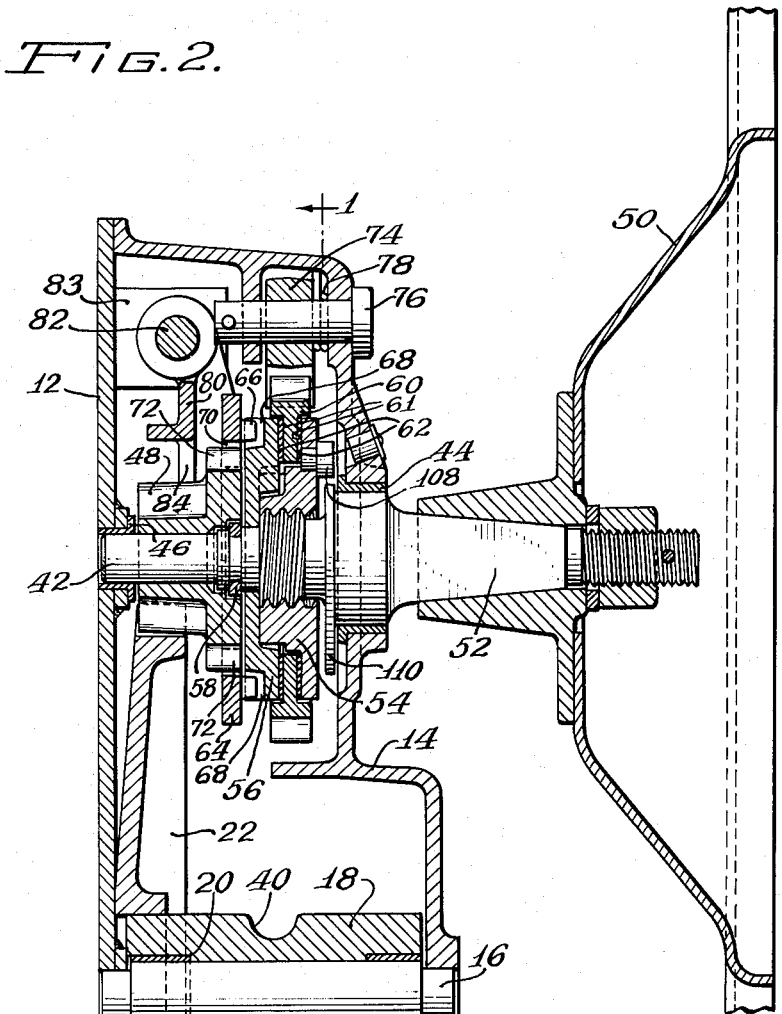
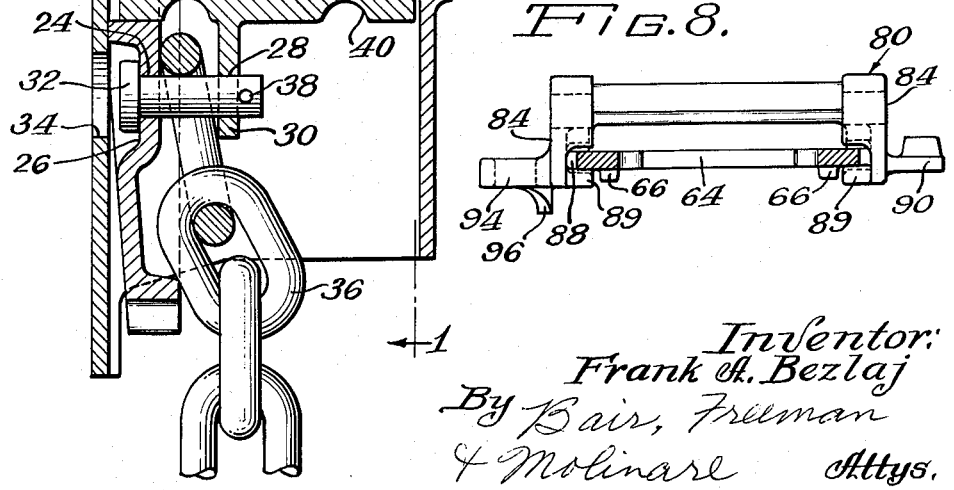
Inventor:
Frank A. Bezlaj
By Bair, Freeman
& Molinare  Attys.

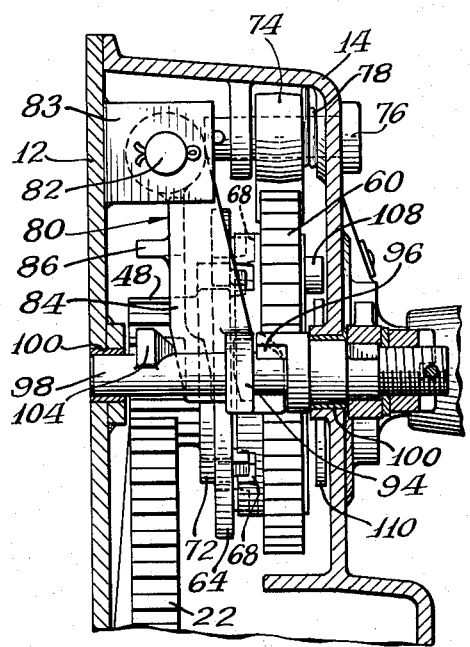
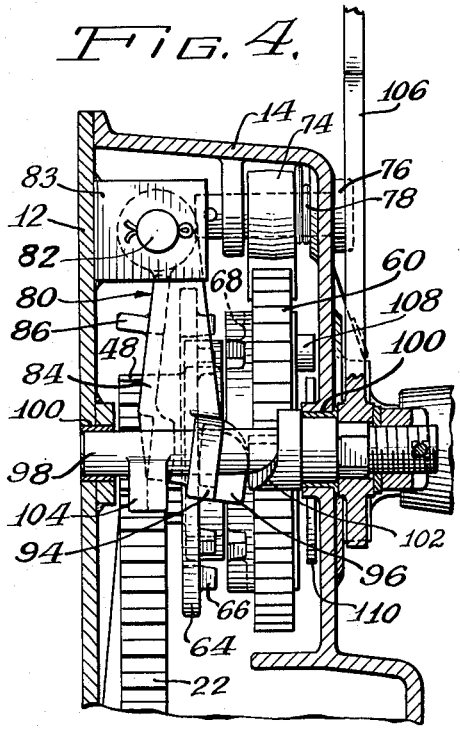
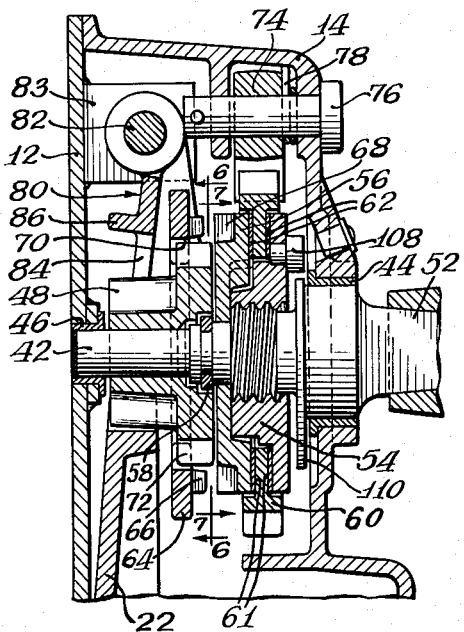
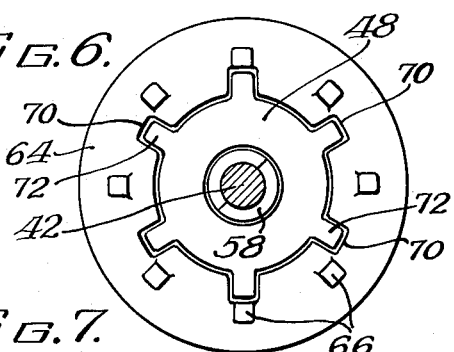
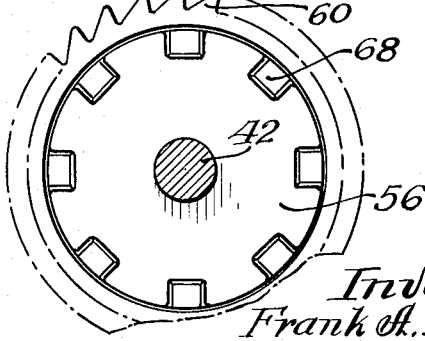

United States Patent Office 3,258,991
Patented July 5, 1966

3,258,991
QUICK RELEASE HAND BRAKE MECHANISM
Frank A. Bezlaj, Matteson, Ill., assignor to Unarco Industries, Inc., a corporation of Illinois
Filed Oct. 14, 1963, Ser. No. 315,750
5 Claims. (Cl. 74—505)

This invention relates to an improved quick release hand brake mechanism and it particularly relates to a highly reliable railway hand brake mechanism having important safety features.

Hand brake mechanisms, which are normally used on freight cars and the like, usually include a drum which carries a chain or cable that is connected to the brake to cause engagement thereof. A driven gear is connected to the drum for turning it; the gear is driven through a driving pinion, which is turned by an operating mechanism, such as a hand wheel or lever.

The provision of a reliable hand brake on a railway car is important from the standpoint of safety since the ability of the brake to retard or stop the car contributes materially to the safety of the operator and to prevention of damage to the car and its contents. Also, it is highly desirable to provide a quick release mechanism for re-releasing the brake, wherein the release mechanism is separate from the mechanism used for applying the brake. As in the case of a hand wheel used for applying the brake, if the brake is released by the same mechanism, the brake may release too quickly and spin, thereby resulting in the possible injury of the operator. Also, the provision of a quick release feature not only provides important safety advantages, it is very convenient since the operator may quickly release the brake with a minimum of effort. Although quick release railway hand mechanisms have ben provided in the past, such mechanisms have not been as safe and reliable as desired.

It is therefore a primary object of this invention to provide a railway hand brake mechanism having a quick release mechanism which is highly reliable and provides safety for the operator.

It is another important object of this invention to provide a railway hand brake mechanism which includes a quick release mechanism, wherein the parts positively engage each other in both the operating and non-operating positions.

It is a further object of this invention to provide a railway hand brake mechanism having a quick release feature wherein the parts of the quick release mechanism positively maintain the brake in both the applied and released positions.

Also, as it is highly advantageous to provide a removable drum used for the chain or cable, whereby drums of varying sizes may be placed upon the same brake mechanism, it is an additional object of this invention to provide a drum which is simply and easily removed from the brake mechanism housing.

It is still another object of this invention to provide a railway brake mechanism having a quick release feature which is characterized by its simplicity and economy of construction.

Further purposes and objects of this invention will appear as the specification proceeds.

A particular embodiment of the present invention is illustrated in the accompanying drawings wherein:

FIGURE 1 is a fragmentary front elevational view of my quick release railway hand brake mechanism, taken along the line 1—1 of FIGURE 2;

FIGURE 2 is a sectional view taken along the line 2—2 of FIGURE 1;

FIGURE 3 is a fragmentary sectional view taken along the line 3—3 of FIGURE 1, showing the brake mechanism in the applied position;

FIGURE 4 is a view similar to FIGURE 3, except that the mechanism is shown in the released position;

FIGURE 5 is a fragmentary sectional view, similar to FIGURE 2, except that the mechanism is shown in the released position;

FIGURE 6 is a sectional view taken along the line 6—6 of FIGURE 5;

FIGURE 7 is a sectional view taken along the line 7—7 of FIGURE 5; and

FIGURE 8 is a detail view, showing the relationship between the yoke member and the coupler plate of the quick release mechanism.

The brake release mechanism, generally indicated as 10, includes a back plate 12 and a front housing 14 which is securely mounted to the back plate 12 by suitable means, as by bolts. The back plate 12 and housing 14 generally enclose the mechanical parts of the mechanism 10.

A gear shaft 16 is securely mounted between the back plate 12 and the housing 14 and receives the chain drum 18, which is rotatable upon the bushings 20 provided on the shaft 16. The large driven gear 22 is formed with a central non-circular opening receiving a non-circular end portion on the chain drum 18 so that the chain drum 18 and driven gear 22 are connected to turn together.

Preferably, the driven gear 22 is provided with an aperture 24 in a recessed area 26. The aperture 24 is aligned with the opening 28 of the radially extending ear 30 of the drum 18. The aperture 24 and opening 28 are adapted to receive the chain pin 32 which is also alignable with the opening 34 provided in the back plate 12. The chain pin 32 receives a link of the chain 36 which is connected to the brake itself (not shown). The chain pin 32 is secured in place by means of a cotter pin 38 passing through the pin 32, adjacent to the outer surface of the ear 30. Furthermore, drum 18, which windably receives the chain 36 includes helical grooves 40 for guiding the chain 36 while being wound on the drum 18.

In the mechanism thus far described, it is seen that the chain drum 18 is readily removable from the mechanism 10. Specifically, by removing the housing 14 from the back plate 12, the chain drum 18 is exposed. The cotter pin 38 is then removed from the chain pin 32 and the chain pin 32 is pushed into the opening 34 provided in the back plate 12. The chain may then be removed, if desired, and the drum 18 may be removed from the shaft 16 and from association with the large driven gear 22. A drum of a different diameter may then be placed on the gear shaft 16 and the driven gear 22 may be placed around the new drum. By varying the outside diameters of the drum 18, the speed with which the brake may be applied may be varied. For example, a large drum will cause the brake to be applied more quickly than a drum having a smaller diameter since for the same degree of rotation, the larger diameter drum will receive a longer length of chain. Thus, by providing a readily replaceable drum, the speed with which a brake may be applied is adjustable to its most convenient and safest rate.

Spaced above and substantially parallel to the gear shaft 16 is a brake shaft 42, which is rotatably carried by the front bushing 44 in the housing 14 and by the rear bushing 46 in the back plate 12. Rotatably mounted on the shaft 42 is the small driving pinion 48, which meshes with the large driven gear 22. The driving pinion 48 may be driven in unison with the shaft 42 for causing rotation of the large driven gear 22. The rotation of the large driven gear 22 applies the car brake mechanism (not shown) and the locking of the pinion 48 maintains the car brake mechanism in the applied position.

The brake shaft 42 is rotated by means of a hand wheel 50, or other suitable means such as a lever. The hand wheel 50 is securely mounted on the tapered front portion 52 of the brake shaft 42, as by a lock washer and a bolt. Upon rotation of the hand wheel 50 in a clockwise direction, the driving pinion 48 is also rotated so as to apply the brake, in a manner to be hereinafter described.

The brake shaft 42 includes an externally threaded portion which threadably engages the internal threads provided on the clutch member 54. Mounted adjacent to the clutch member 54 on the shaft 42 is the driving ring 56. Rearward movement of the clutch member 54 and the driving ring 56 is prevented by the split ring 58. Sandwiched between the clutch member 54 and the driving ring 56 is a ratchet 60, friction discs 62 being positioned in the annular recesses 61 of the ratchet 60. The friction discs 62 cause the clutch member 54, the driving ring 56, and the ratchet 60 to move in unison when the hand wheel is rotated in a clockwise direction to force the parts into tight engagement with the split ring 58.

In order to impart rotation of the driving ring 56 to the pinion 48, an actuating or coupler plate 64 is provided for connection therebetween. The coupler plate 64 is adapted to be moved in a direction parallel with the brake shaft 42, in order to engage or disengage the pinion 48 from the driving ring 56. Specifically, the coupler plate 64 is provided with circumferential nubs 66 which are adapted to be received in the complementary recesses 68 of the driving ring 56; also, the coupler plate 64 is provided with radial notches 70 which are adapted to be received by the complementary splines 72 of the driving pinion 48. Thus, when it is desired to rotate the pinion 48, the nubs 66 are in engagement within the recesses 68 of the driving ring 56 and, when it is desired that the pinion 48 be disengaged from the driving ring 56, the plate 64 is moved outwardly from the driving ring 56 in order to disengage the nubs 66 from the recesses 68, thereby allowing the pinion to be freely rotatable upon the brake shaft 42.

In order to maintain the shaft 42 and thereby the brake in a locked position, the teeth of the ratchet 60 are adapted to engage a pawl 74, which is pivotably and springably mounted on the pawl pin which is fixed in the housing 14. The pawl 74 is normally biased into engagement with the ratchet 60, by means of the pawl spring 78. The teeth of the ratchet 60 and the pawl 74 are adapted to cooperate in such a manner that, upon clockwise rotation of the hand wheel 50, the ratchet and pawl mechanism will prevent counter-clockwise rotation thereof.

An important feature of this invention is that the car brake may be quickly released by a unique mechanism which includes a yoke 80, which is pivotably mounted on the back plate 12. The yoke 80 is pivotably mounted by means of a yoke pin 82 which is fixed to a pair of arms 83 projecting frontwardly from the back plate 12. The yoke 80 includes lever arms 84 which are rotatably carried by the yoke pin 82, the lever arms 84 being connected together by a cross-bar 86. Each of the lever arms 84 is provided with substantially vertical inwardly extending grooves 88 formed by spaced ridges 89. The ridges 89 are adapted to positively engage both sides of the coupler plate 64 at two positions, near the outer diameter thereof. Thus, at all times the grooves 88 are maintained in engagement with the coupler plate 64, that is, while in both the engaged and disengaged positions. One of the lever arms 84 is provided with a sidewardly extending boss 90, having a tapered portion for receiving a yoke spring 92. The yoke spring 92 is adapted to normally bias the yoke member 80 in such a direction that the coupling plate 64 is biased into engagement with the driving ring 56. The other of the lever arms 84 is provided with a sidewardly extending saddle portion 94, having a frontwardly positioned cam 96. The saddle portion 94 is generally U-shaped and opens in a downward direction.

A cam shaft 98 is rotatably carried by the back plate 12 and the housing 14, by bushings 100. The cam shaft 98 is straddled by the U-shaped saddle portion 94 so as to provide positive engagement between the cam shaft 98 and the saddle portion 94 of the yoke 80. The cam shaft 98 includes a forward cam 102, which is adapted to meet the cam 96 provided on the saddle portion 94, and also includes a rear cam 104. The cam shaft 98 fixedly carries a release handle 106 which projects outwardly from the housing 14 and is provided for rotating the shaft 98. When the release handle 106 is turned in a clockwise direction, the cam shaft 98 is likewise turned in a clockwise direction, whereby the forward cam 102 meets the cam 96 of the saddle portion 94 and rotatably moves the yoke 80 rearwardly so as to move the coupler plate 64 out of engagement with the driving ring 56, whereby the car brake is released since the pinion 48 is freely rotatable upon the brake shaft 42. The rear cam 104 prevents overtravel of the yoke 80 in order to prevent the coupling plate 64 from becoming disengaged from the splines 72 of the pinion 48. Upon rotating the release handle 106 in a counterclockwise direction, the rear cam 104 also assists the yoke spring 94 in returning the yoke 80 and the coupler plate 64 to the engaged position for applying the brake. Thus, it is seen that the cam shaft 98, the yoke 80 and coupler plate 64 are maintained in positive engagement at all times and there is substantially no chance for separation of the parts, which would most likely result in jamming of the mechanism.

Although the operation of the mechanism should be clear from the foregoing description, a brief description of the operation will be provided. When the operator desires to apply the brake on the railway car, the hand wheel 50 is turned in a clockwise direction, thereby rotating the brake shaft 42. Since the brake shaft 42 threadably engages the clutch member 54, the clutch member 54 moves towards the driving ring 56 and both move against the split ring 58. Also, the ratchet 60, sandwiched between the clutch member 54 and the driving ring 56, is firmly held therebetween, and by means of the friction discs 62, the rotation of the shaft 42 is imparted to the clutch member 54, the driving ring 56, and the ratchet 60, which are then rotatable in unison. Reverse movement of the shaft 42 and parts thereon is prevented since the teeth of the ratchet 60 engage the inwardly biased pawl 74.

When the brake is applied, the release handle 106 is rotated in the full counter-clockwise position and the coupler plate 64 provides connection between the driving ring 56 and the pinion 48. Thus, the pinion 48 is rotated in unison with the driving ring 56, so as to rotate the driven gear 22 which, through connection with the chain drum 18, causes the chain 36 to be wound therearound for applying the brake of the railway car. The brake is then maintained in the applied position by means of the ratchet and pawl mechanism.

When it is desired to release the brake, the hand wheel may be turned in a counter-clockwise direction, thereby moving the clutch member 54 away from engagement with the driving ring 56, whereby all the parts including the pinion 48 are freely rotatable upon the brake shaft 42. However, for increased speed in releasing the brake, it is preferable that the quick release feature be utilized. Thus, by merely pivoting the release handle clockwise approximately 90°, the cam shaft 98 is rotated from the position shown in FIGURE 3 to the position shown in FIGURE 4, whereby the yoke 80 is pivoted rearwardly when the forward cam 102 of the shaft 98 meets the cam 96 of the saddle portion 94. Undesired overtravel of the yoke 80 is prevented by means of the rear cam 104. The rearward pivoting of the yoke 80 also causes rearward movement of the coupler plate 64, which then disengages the driving ring 56 from the pinion 48. This enables the pinion to be freely rotatable upon the brake shaft 48 and allows free rotation of the large driven gear 22 for releasing the car brake.

If the handwheel 50 is used for releasing the brake, a clutch pin 108 is provided on the clutch member 54 and an arm 110 is provided on the brake shaft; the pin 108 is adapted to abut the arm 110 so as to prevent overtravel of the clutch member 54 along the shaft 42, which would cause jamming of the mechanism.

When it is desired to reapply the brake, the release handle 106 is turned counter-clockwise approximately 90° to the starting position, during which movement, the rear cam 104, along with the yoke spring 92, causes forward movement of the yoke 80. If the nubs 66 do not immediately engage the recesses 68, the operator merely rotates the hand wheel 50 a slight degree in order that the parts do become engaged.

While in the foregoing there has been a detailed description of a particular embodiment of the present invention, it is to be understood that all equivalents obvious to those having skill in the art are to be included within the scope of the invention as claimed.

What I claim and desire to secure by Letters Patent is:

1. A railway hand brake mechanism comprising a large gear, means for connecting said gear to a brake, a pinion engaging and driving said gear, a shaft rotatably carrying said pinion, means for turning said shaft, means for locking said shaft in a desired turned position, including a coupling plate operatively connecting said pinion to said turning means, a pivotable yoke member engaging both sides of said coupling plate, said yoke having a saddle portion, a cam shaft receiving said saddle portion, a cam on said cam shaft, said cam being aligned with said saddle portion, and means for rotating said cam shaft for moving said yoke member and thereby said coupling plate in response to the movement of said cam whereby said coupling plate disconnects said pinion from said turning means for releasing said brake.

2. A railway hand brake mechanism comprising a large driven gear, means for connecting said gear to a brake, a pinion engaging and driving said gear, a shaft rotatably carrying said pinion, means for turning said shaft to a desired rotated position, means operatively connected to said turning means for locking said shaft in the desired rotated position, including a coupler plate operatively connecting said pinion to said turning means, a yoke member engaging both sides of said coupling plate, said yoke member having a U-shaped saddle portion, a cam shaft receiving said saddle portion, first and second cams positioned on said cam shaft, said saddle portion being located between said cams, means for rotating said cam shaft for moving said yoke member and thereby said coupler plate in response to said first cam, whereby said coupler plate disconnects said pinion from said turning means and releases said brake and, upon reverse rotation of said rotating means, said second cam assists in moving said yoke forward for causing said coupler plate to reconnect said pinion to said turning means.

3. The railway hand brake mechanism of claim 2 wherein means are provided for normally biasing said yoke in a direction for maintaining the connection between said turning means and said pinion.

4. A railway brake mechanism comprising a large driven gear, means for connecting said large gear to a brake, a driving pinion engaging and driving said gear, a brake shaft rotatably carrying said pinion, means for turning said brake shaft to a desired position for applying said brake mechanism, means operatively connected to said turning means for locking said shaft in the desired position, including a coupler plate movable along said drive shaft and operatively connecting and disconnecting said pinion from said turning means, a pivotably mounted yoke member positively engaging both sides of said coupler plate at spaced locations, said yoke having a U-shaped saddle portion, a cam shaft substantially parallel to said brake shaft and receiving said U-shaped saddle portion, first and second cams positioned on said cam shaft, said saddle portion being located between said cams, means for rotating said cam shaft for rearwardly moving said yoke member and thereby said coupler plate in response to said first cam, whereby said pinion is disconnected from said turning means for releasing said brake, and, where upon reverse rotation of said rotating means, said second cam assists in rotatably moving said yoke member and thereby said coupler plate forward in order to reconnect said pinion to said turning means so that said brake mechanism may be re-applied.

5. A railway hand brake mechanism of the type utilizing a chain or cable for applying a brake, said mechanisms comprising a housing, a driven gear rotatably carried within said housing, a shaft fixedly mounted in said housing, a drum rotatably mounted on said shaft and windably receiving said chain or cable, said driven gear being removably mounted on said drum, the rotation of said gear being transmittable to said drum for winding said chain or cable on said drum, a pinion engaging and driving said gear, a shaft rotatably carrying said pinion, means for turning said shaft to a desired position, means operatively connected to said turning means for locking said shaft in the desired position, including a coupler plate for connecting said pinion to said turning means, a yoke engaging both sides of said coupler plate, said yoke having a saddle portion, a cam shaft receiving said saddle portion, and means for rotating said cam shaft for moving said yoke member and thereby said coupler plate rearwardly in response to the movement of said cam, whereby said coupler plate disconnects said pinion from said turning means and releases said brake.

References Cited by the Examiner

UNITED STATES PATENTS

| | | | |
|---|---|---|---|
| 1,599,633 | 9/1926 | Bemis | 74—505 |
| 2,272,437 | 2/1942 | Smith | 74—505 |
| 3,040,597 | 6/1962 | Bretz | 74—505 |
| 3,176,539 | 4/1965 | Mersereau | 74—505 |

MILTON KAUFMAN, *Primary Examiner.*